United States Patent
Fujishita et al.

(10) Patent No.: US 7,694,074 B2
(45) Date of Patent: Apr. 6, 2010

(54) REMOVABLE MEDIUM APPARATUS AND CONTROL METHOD THEREOF

(75) Inventors: Masahiro Fujishita, Nagoya (JP); Fumitoshi Uno, Okazaki (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 503 days.

(21) Appl. No.: 11/564,113

(22) Filed: Nov. 28, 2006

(65) Prior Publication Data
US 2007/0124338 A1 May 31, 2007

(30) Foreign Application Priority Data
Nov. 28, 2005 (JP) ............... 2005-341715

(51) Int. Cl.
*G06F 12/00* (2006.01)
(52) U.S. Cl. .................................... 711/115
(58) Field of Classification Search ............. None
See application file for complete search history.

(56) References Cited

U.S. PATENT DOCUMENTS 6,484,173 B1* 11/2002 O'Hare et al. ............. 707/9
2002/0114461 A1* 8/2002 Shimada et al. .......... 380/201
2002/0138754 A1* 9/2002 Himeno .................... 713/200
2003/0167395 A1* 9/2003 Chang et al. .............. 713/183
2006/0232826 A1* 10/2006 Bar-El ....................... 358/403
2006/0294104 A1* 12/2006 Morrison et al. ............ 707/9

FOREIGN PATENT DOCUMENTS

JP    H6 266636    9/1994
JP    2004 186961    7/2004

* cited by examiner

*Primary Examiner*—Hiep T Nguyen
(74) *Attorney, Agent, or Firm*—Baker Botts, LLP.

(57) ABSTRACT

A removable-medium apparatus that outputs data that is stored on a removable medium that updates ID information that corresponds to data stored on said removable medium when it is detected that a removable medium is mounted, and sends the ID information that is updated. Also, it sends data when receiving a request to send data that is stored on said removable medium and that corresponds to the updated ID information.

23 Claims, 5 Drawing Sheets

REMOVABLE MEDIUM APPARATUS AND CONTROL METHOD THEREOF

CROSS REFERENCE TO RELATED APPLICATIONS

This Nonprovisional application claims priority under 35 U.S.C §119 (a) on Patent Application No. 2005-341715 filed in Japan on Nov. 28, 2005, the entire contents of which are hereby incorporated by reference.

BACKGROUND

The present invention relates to a removable-medium apparatus and control method thereof, and more particularly to a removable-medium apparatus and control method thereof which are capable of sending data that is stored on a removable medium via a network.

Data such as image data that is taken by a digital camera, or text that is created by a computer are stored on a memory card that can be freely mounted or removed (removable medium). The memory card is mounted in a card reader (removable-medium apparatus) which is connected to a network, and data that is stored on that memory card is read, and that data is inputted via a network to a computer which is connected to the network (refer to Japanese Patent Application Laid-Open No. 2004-186961).

SUMMARY

However, when acquiring data that is stored on a memory card by using a browser that is installed in the computer, that data is stored in a cache memory. When specifying the same file name again and accessing that data, the date and time when the data that is stored in the cash memory was updated, and the date and time when the data that is stored on the memory card was updated are compared, and the data having the most recent update date and time is acquired. However, when mounting a memory card in a card reader, it may be desired that the data that is stored on that memory card be accessed, so there is a problem in that it may not be possible to obtain the desired data.

Taking the aforementioned problem into consideration, the object of the present invention is to provide a removable-medium apparatus and control method thereof which make it possible for a computer to acquire data that is stored on a removable medium that is mounted in the removable-medium apparatus which is connected to a network.

In order to accomplish this object, this invention is a removable-medium apparatus which outputs data that is stored on a removable medium, comprising: a detection unit which detects that the removable medium is mounted; an update unit which updates ID information that corresponds to data stored on the removable medium when the detection unit detects that the removable medium is mounted; an ID information output unit which outputs the ID information that is updated by the update unit; and a data output unit which outputs data when receiving a request to send the data that is stored on the removable medium and that corresponds to the ID information that is updated by the update unit.

Also, the invention is a removable-medium apparatus which outputs data that is stored on a removable medium, comprising: a detection unit which detects that a communication to an external apparatus is performed; an update unit which updates ID information that corresponds to data stored on the removable medium when the detection unit detects that the communication is performed; an ID information output unit which outputs the ID information that is updated by the update unit; and a data output unit which outputs data when receiving a request to send the data that is stored on the removable medium and that corresponds to the ID information that is updated by the update unit.

Therefore, it is possible to send data that is stored on a removable medium that is mounted in a removable-medium apparatus. In other words, when a browser obtains data based on a file name (data ID information), even when obtaining data that is stored in the cache memory or on a removable medium having a new update date, the file name of data that is stored on the removable medium is updated when the removable medium is mounted, or when communication is performed, and data is searched for using that updated file name, so data that is stored on the removable medium is accessed instead of data stored in the cache memory.

The above and further objects and features of the invention will be more fully apparent from the following detailed descriptions with accompanying drawings.

DETAILED DESCRIPTION OF THE EXEMPLARY EMBODIMENTS

Figure 1:
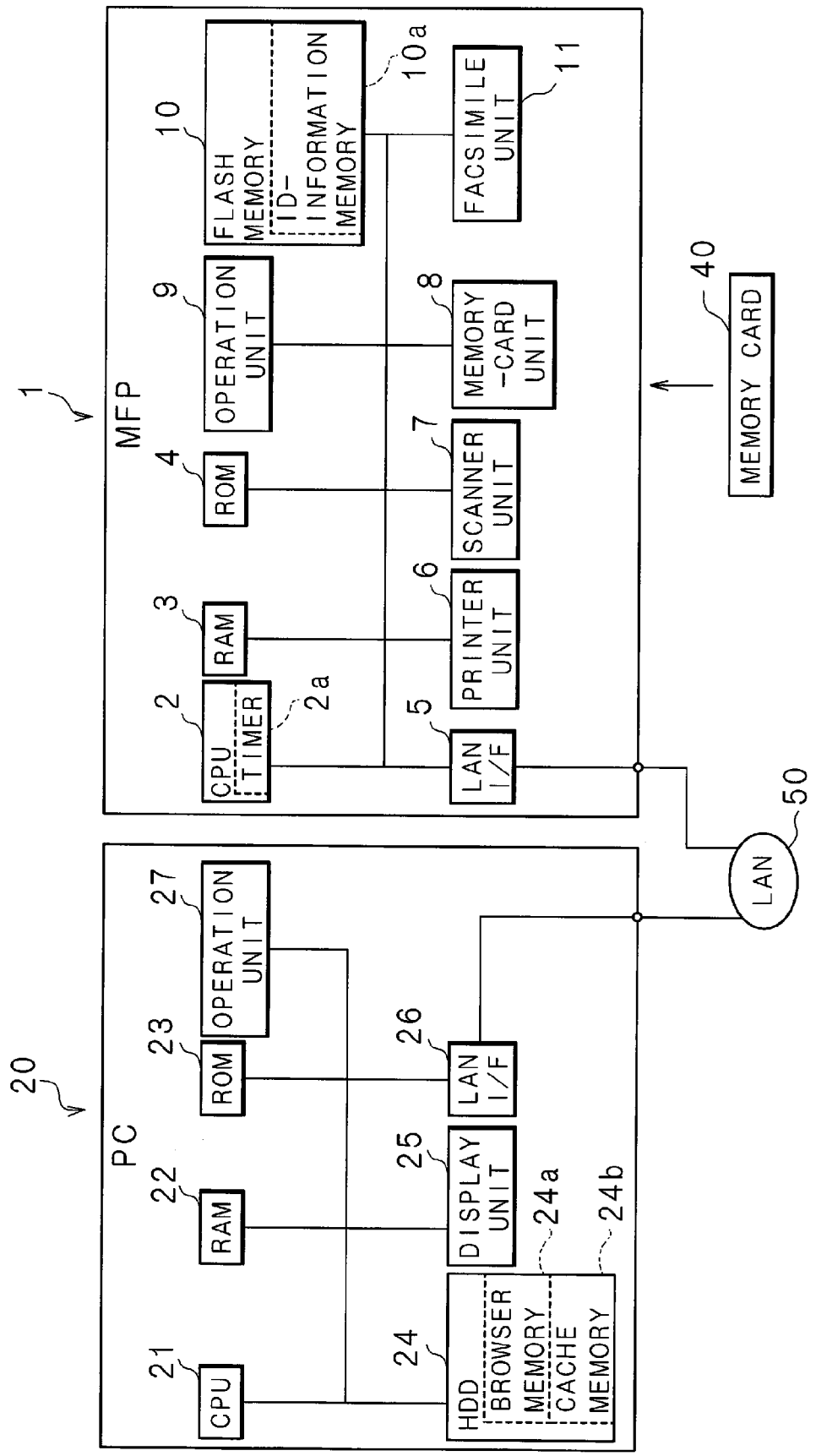
FIG. 1 is a block diagram showing the construction of a communication system that includes a multi-function peripheral apparatus.

The embodiments of the present invention will be explained below based on the drawings. FIG. 1 is a block diagram showing the construction of a communication system that comprises: a multi-function peripheral apparatus (hereafter referred to as MFP) 1, which is an embodiment of the present invention, and a personal computer (hereafter referred to as PC) 20 that is connected via a LAN (Local Area Network) 50.

The MFP 1 comprises various functions in one unit such as a photo-media-capture function, printer function, copy function, scanner function, facsimile function or the like. The photo-media-capture function is a function that comprises a memory-card unit 8 in which a memory card 40 can be freely mounted or removed, and that prints data that is stored on the memory card 40, or transfers that data to the PC 20 via the LAN 50.

As shown in FIG. 1, the MFP 1 mainly comprises: a CPU 2 that controls the overall operation of the MFP 1; RAM 3 that is a memory for temporarily storing data or programs that are necessary for various processings that are executed by the CPU 2; ROM 4 that stores various control programs that are executed by the CPU 2, and fixed-value data; an LAN interface (hereafter, referred to as LAN I/F) 5, a printer unit 6, a scanner unit 7, the memory-card unit 8, an operation unit 9 that has a plurality of operation-input keys (buttons, switches, etc.) for making the MFP 1 execute various functions; a flash memory 10, and a facsimile unit 11 that sends or receives image data via a telephone line (not shown in the figure).

The CPU 2 is a processor that executes the various programs that are stored in the ROM 4, and comprises a timer 2a. The timer 2a keeps time in years, months, days, hours, minutes and seconds, and when image data is sent or received by the facsimile unit 11, for example, the time of transmission is recorded in the flash memory 10 together with the transmission destination as a record of the communication transmission. The RAM 3 is a memory that can be accessed at random when the CPU 2 executes various programs, and it has a work area that temporarily stores variables and the like.

The operation unit 9 comprises a plurality of switches and a display on an operation panel, and by operating the switches, a user can send instructions to the MFP 1, and the display displays setting screens on which various values are set, and displays the set values. The switches include mode-selection keys for selecting various functions such as a copy function, scanner function or facsimile function, and a ten-key pad from which it is possible to input numbers or letters. By operating the mode switches, it is possible to set the photo-media-capture mode that executes the photo-media-capture function, the scanner mode that executes the scanner function, the facsimile mode that executes the facsimile function, or the like. Moreover, by operating the ten-key pad it is possible to input a facsimile transmission number, or to input a user number for specifying ID information.

The LAN I/F 5 is an interface with the LAN 50, and in this embodiment, communication between the MFP 1 and PC 20 is performed according to FTP (File Transfer Protocol). In other words, the MFP 1 operates as a FTP server, and the PC 20 accesses a memory card 40.

The printer unit 6 is an ink-jet type of printer for printing on paper that is placed in a specified paper-supply location (not shown in the figure) according to instructions from the CPU 2, and it comprises: a paper-feed motor (not shown in the figure) that feeds the paper; a printing head (not shown in the figure) that sprays ink onto the paper; and a carriage motor (not shown in the figure) that moves a carriage (not shown in the figure) in which the printing head is mounted.

The scanner unit 7 reads images from a document that is placed in a specified reading location (not shown in the figure) according to instructions from the CPU 2, and creates image data of that image. The image data that is created by the scanner unit 7 is sent to the PC 20 via the LAN 50.

Moreover, when the MFP 1 is set to the copy mode so that the MFP 1 executes the copy function, the image data that is created by the scanner unit 7 is printed on paper by the printer unit 6. Furthermore, when the MFP 1 is set to the scanner mode so that the MFP 1 executes the scanner function, the image data that is created by the scanner unit 7 is stored in a specified memory area in the RAM 3.

The memory-card unit 8 comprises a slot in which various kinds of memory cards 40 can be freely mounted or removed, and it can read data that is stored on a memory card 40 that is mounted in the slot, or can write new data to the memory card 40. Data that is read from the memory card 40 can be sent to the PC 20 via the LAN 50.

The flash memory 10 is a nonvolatile memory from which various data can be read, or to which various data can be written, and it comprises an ID-information memory 10a in which ID information is stored that specifies files on a memory card 40 that is mounted in the memory-card unit 8. The ID information that specifies files is a sub-directory name that indicates a file path; for example, in the case of 'Memorystk0001', a 4-digit number is assigned to each type of memory card 40. This number is increased by '1' and updated each time a memory card 40 is inserted into the memory-card unit 8. Also, this number is updated even when a memory card 40 is already inserted when the power to the MFP 1 is turned on.

ID information is assigned to the data stored on the memory card 40 so that it is different from ID information that was assigned in the past. When doing this, by storing a list of ID information that has been assigned in the past in the flash memory 10, it is possible to easily assign new ID information. Also, since ID information is assigned for each type of memory card 40, it is possible to reduce the amount of ID information stored, when compared with the amount stored when assigning ID information regardless of the type of memory card 40. For example, when assigning a number as ID information regardless of the type of memory card 40, in order to assign a number that is different from a number that has been assigned in the past, it is necessary to use a number having a large number of digits, however, when assigning a number for each type of memory card 40, it is possible to reduce the number of digits. Also, since the number assigned is increased by '1' each time a memory card 40 is inserted, it is possible to assign ID information that is different from ID information that has been assigned in the past by creating a simple process or program.

When a list request for file names is received from the PC 20 via the LAN 50, updated ID information is sent as a sub directory name together with file names to the PC 20, so it is possible to specify a file name from the PC 20.

Next, an explanation of the PC 20 will be given. The PC 20 comprises: a CPU 21; ROM 22 that stores various control programs that are executed by the CPU 21, and fixed-value data; RAM 23 that is memory for temporarily storing data or programs necessary for the various processings that are executed by the CPU 21; a nonvolatile hard disk (HDD) 24 that stores various settings and that can be written over; an operation unit 27 that has a keyboard, having a plurality of operation-input keys for setting various functions, and a mouse; a display unit 25 that is a liquid-crystal display for displaying various information; and an LAN interface unit, LAN I/F 26, for connecting to the LAN 50.

The hard disk 24 comprises: a browser memory 24a that stores the browser; a cache memory 24b that stores information that is obtained by the browser; and a memory (not shown in the figure) that stores the OS and various application programs.

Figure 2:
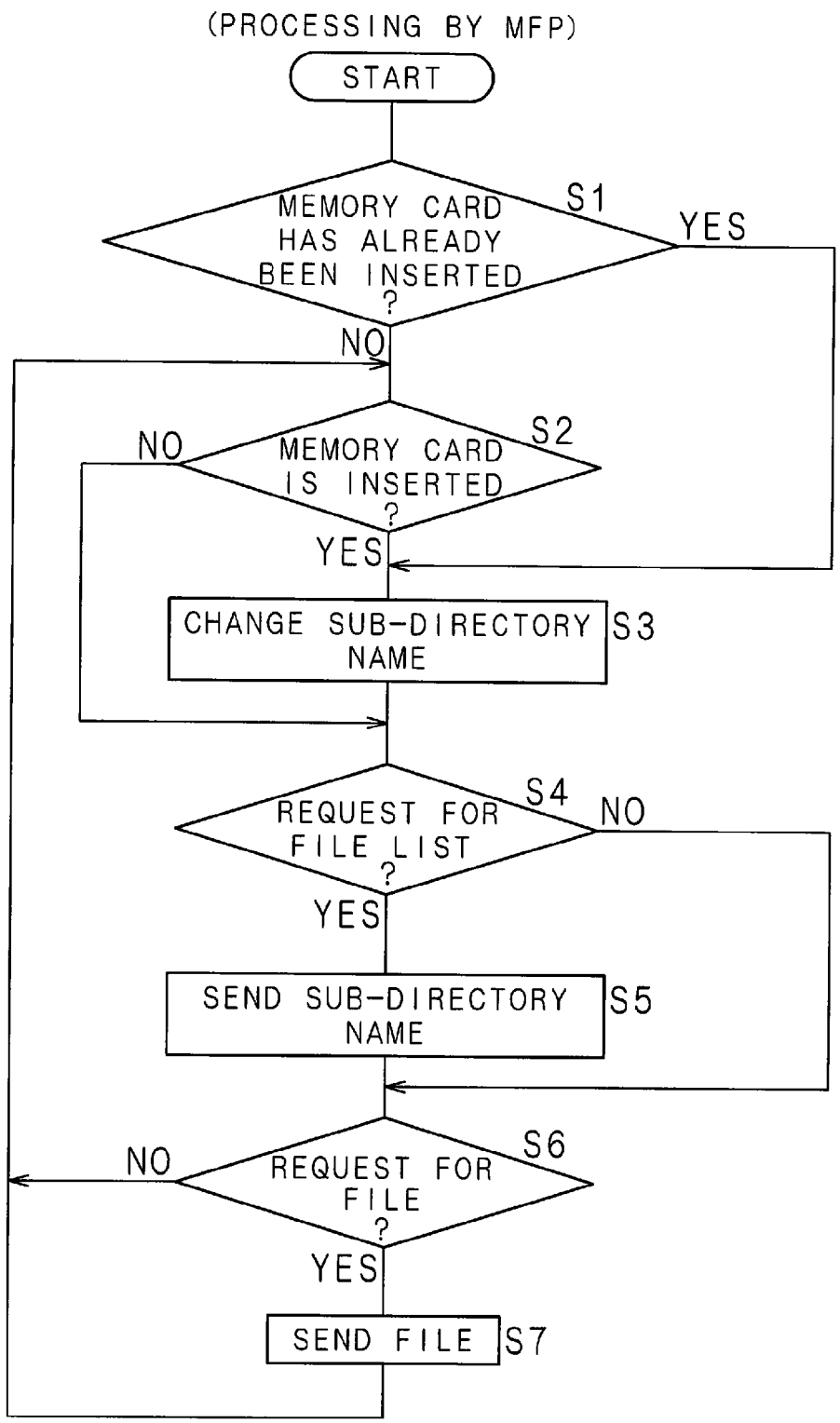
FIG. 2 is a flowchart showing the processing by a multi-function peripheral apparatus.

Next, the processing by the MFP 1 will be explained with reference to FIG. 2. FIG. 2 is a flowchart that shows the processing by the MFP 1, and this processing is activated when the power to the MFP 1 is turned on, and is repeatedly performed until the power is cut off.

After the power has been turned on, the MFP 1 first determines whether or not a memory card 40 has already been inserted in the memory-card unit 8 (S1). When it is determined that a memory card 40 has not yet been inserted (S1: NO), the MFP 1 determines whether or not a memory card 40 is inserted (S2). When a memory card 40 is inserted (S2: YES), or in the judgment processing of step S1 when it is determined that a memory card 40 has already been inserted (S1: YES), the MFP 1 reads the sub-directory name that is stored in the ID-information memory 10a of the flash memory 10 that corresponds to the type of that memory card 40 and adds '1' to the 4-digit number included in that sub-directory name (S3). By doing this, it is possible to update the file names of the data that is stored on a memory card 40 when a memory card 40 is newly inserted into the memory-card unit 8. It is possible that a memory card 40 is inserted while the power to the MFP 1 is cut off, so the MFP 1 updates the sub directory even when a memory card 40 has already been inserted at the time the power to the MFP 1 is turned on.

Next, the MFP 1 determines whether or not a request for a file list has been received (S4). This file-list request is sent from a browser to the MFP 1 when the browser that is activated at the PC 20 is used by a user to perform a setting to login to the MFP 1.

When a file-list request has been received (S4: YES), the MFP 1 sends the sub-directory name that is stored in the ID-information memory 10a of the flash memory 10 to the PC 20. To explain this in more detail, a route directory is first requested from the browser, and the MFP 1 sends a list of route-directory names, after which the browser next requests the sub directory, and the MFP 1 sends the sub-directory name (S5).

At the PC 20, the received sub directory is displayed, and by double clicking on this sub directory, the user requests that a file specified from this sub directory be sent.

After the processing of step S5 has ended, or in the judgment processing of step S4 when it is determined that there is no request for a file list (S4: NO), the MFP 1 determines whether or not a request to send a file has been received (S6), and when a request to send a file has been received (S6: YES), the MFP 1 sends that file (S7). When it is determined that a request to send a file has not been received (S6: NO), the procedure is returned to the processing of step S2. The request for a file list is performed after verification of the user name and password is successful when the browser is logged in to the FTP server, however, in the explanation given above, the verification process is omitted in order to make the explanation easier to understand.

Figure 3:
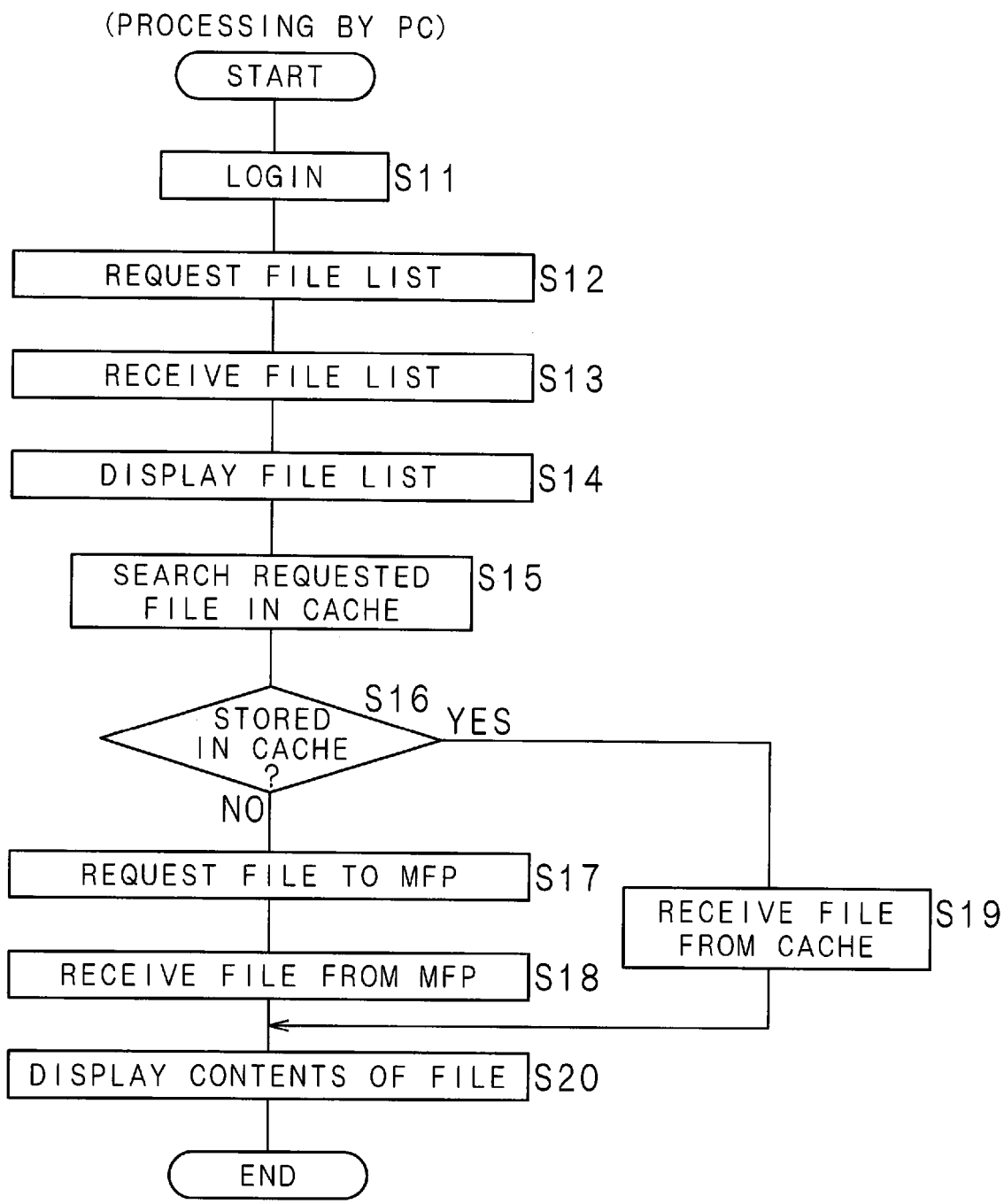
FIG. 3 is a flowchart showing the processing by a computer.

Next, the processing by the PC 20 will be explained with reference to FIG. 3. FIG. 3 is a flowchart that shows the processing by the PC 20. First, the PC 20 activates the browser and logs in to the MFP 1 that functions as an FTP server (S11). When doing this, a user name and password is sent to the MFP 1, and after they have been verified, the browser requests a file list (S12). In response to the file-list request, the MFP 1 first sends a route directory, and next the browser requests a file list related to the route directory. In response to this file-list request, the MFP 1 sends a sub-directory name, and when the browser receives this (S13), it displays a screen on the display unit 25 in which the sub directory is displayed in the route directory (S14, see FIG. 4A or FIG. 4B).

When the user double clicks on a file name that is listed in the sub directory that is displayed on the display unit 25, the browser searches whether or not the specified file is stored in the cache memory 24b (S15). When that file is stored in the cache memory (S16: YES), the browser reads that file from the cache memory 24b (S19) and displays it on the display unit 25 (S20).

When it is determined that the specified file is not stored in the cache memory 24b (S16: NO), the PC 20 sends a request to the MFP 1 for that file (S17). After that file has been received from the MFP 1 (S18), the browser displays the contents of that file on the display unit 25 (S20).

Figure 4A:
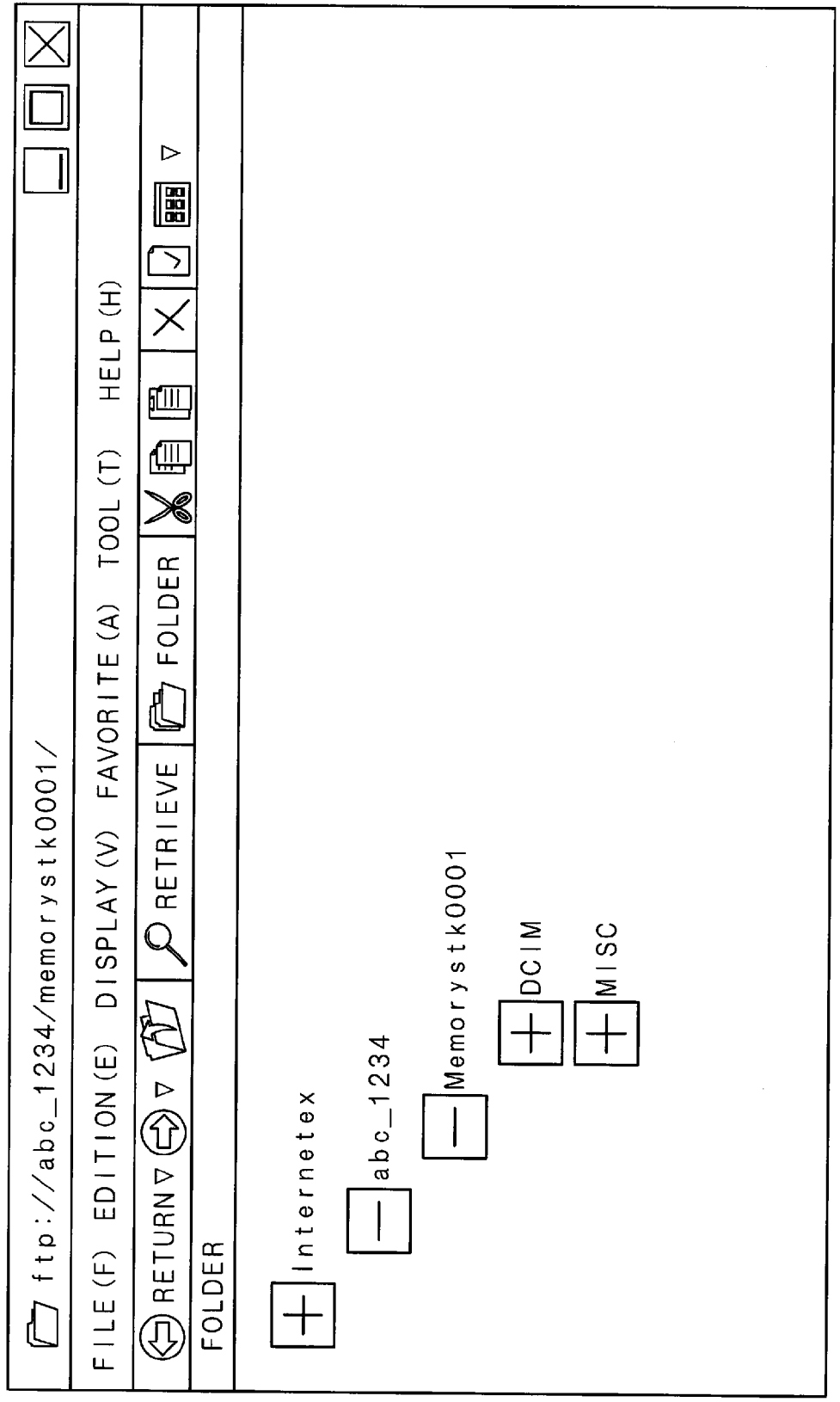
FIG. 4A is a drawing of a display screen that is displayed the previous time by the browser of the computer.
Figure 4B:
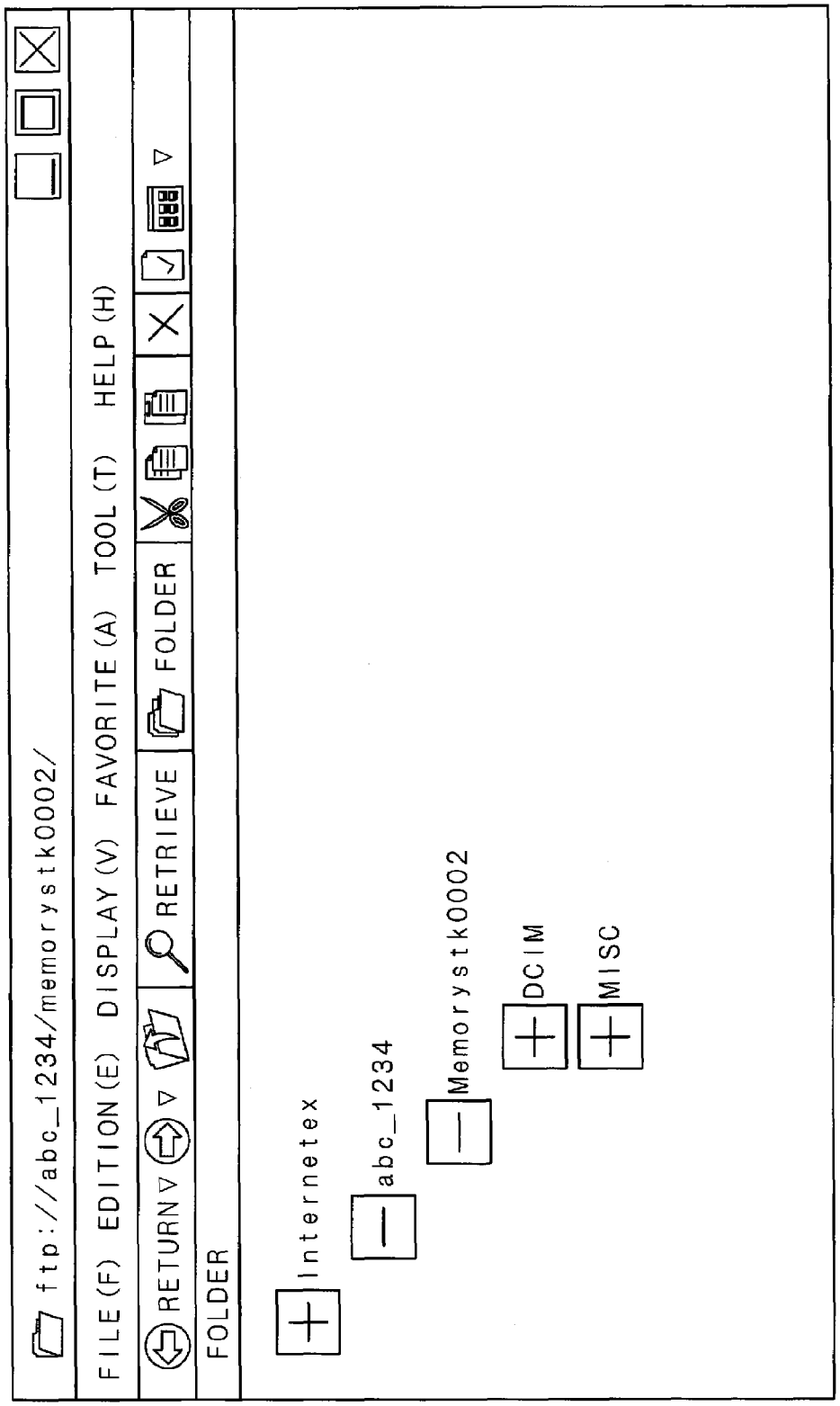
FIG. 4B is a drawing of a display screen that is displayed currently by the browser of the computer.

FIGS. 4A and 4B show the display screens that are displayed by the browser of the PC 20, and are displayed in step S14 of the flowchart shown in FIG. 3. The route directory is 'abc_1234'. FIG. 4A is a screen that is displayed when the file is accessed the previous time, where the sub directory is 'Memorystk0001' and there are files stored in the cache memory 24b under this sub-directory name.

FIG. 4B is a display screen that is displayed when the file is accessed this time, and here the sub directory is updated to 'Memorystk0002'. Here, the files that are stored in the cache memory 24b are under a different sub-directory name, so they are recognized as being different files, and the PC 20 sends a request to the MFP 1 for the files. Therefore, the data that is stored on the memory card 40 that is mounted in the MFP 1 is displayed.

As is explained using the embodiment described above, when a memory card 40 is mounted in the MFP 1, the sub-directory name of the files stored on the memory card 40 is updated, and access from the PC 20 is performed based on that updated sub-directory name, so even when a file is stored in the cache of the PC 20, it is possible to read a file from the MFP 1. Also, when a memory card 40 is already mounted in the MFP 1 when the power is turned on, the sub-directory name of the files stored on the memory card 40 is updated, so even when a memory card 40 is mounted or replaced while the power is cut off it is possible to update the sub-directory name (ID information).

As is explained using the embodiment described above, when a password is stored on the memory card 40, the MFP 1 sets that password as a valid password, and determines whether or not the password that is received at the same time as the login request from the PC 20 matches the valid password, and when they match, regards login as being successful and sends the data stored on the memory card 40 to the PC 20. On the other hand, when the received password does not match the valid password, the MFP 1 regards login as having failed, and notifies the PC 20 that login fails.

Also, when there is no valid password stored on the memory card 40 and there is a login request, the MFP 1 regards login as being successful regardless of the password, and sends the data stored on the memory card 40 to the PC 20.

Therefore, when there is a valid password stored on the memory card 40, only users that input the correct password from the PC 20 can obtain the data that is stored on the memory card 40. Also, when there is no password stored on the memory card 40, it is possible to obtain the data stored on the memory card 40 regardless of the password.

The present invention is explained based on the embodiment described above, however the invention is not limited to the embodiment above, and as can be easily imagined, the embodiment can be modified or changed within the range of the invention.

For example, in the embodiment described above, a password is stored on the removable medium, and when a password that is entered via a network matches the password stored on the removable medium, data that is stored on the removable medium is outputted via the network, and when a password that is entered via a network does not match the password stored on the removable medium, data that is stored on the removable medium is not outputted via the network. However, it is also possible to store a plurality of data and ID information for each item of data on a removable medium, and when ID information that is entered via the network matches any of the ID information that is stored on the removable medium, output data that corresponds to that ID information via the network, and when ID information that is entered via the network does not match any of the ID information stored on the removable medium, not output data corresponding to any ID information via the network. In this case, each item of data can be stored for each folder or each file.

Also, in the embodiment described above, when a removable medium is mounted in the MFP 1, the sub directory is updated, however, it is also possible to update the sub directory when there is a login request from the PC 20 via the network, when there is a request to transfer a file, or when a file is transferred.

Moreover, in the embodiment described above, the card reader is assembled in the MFP 1, however, the card reader could also be a separate device that functions independently as a card reader or card writer.

Furthermore, in the embodiment described above, a numerical value is included in the sub directory, which is the ID information, and the ID information is updated by increasing that value by '1', however, it is also possible to set a sub directory based on the time that is kept by the timer 2*a* in the CPU 2. For example, instead of a numerical value in the sub directory, it is possible to use a numerical value that comprises the month, day, hour and minute. In doing so, it is possible to assign ID information that is different from ID information that is assigned in the past.

Also, in the embodiment described above, the card reader is controlled by the CPU, which is a component of the MFP 1, however, it is also possible for the card reader to be connected to a computer by way of an interface such as a USB interface, and for that computer to be connected to other computers via a network.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A removable-medium apparatus which outputs data that is stored on a removable medium via a network, comprising:
    a detection unit which detects that said removable medium is mounted;
    an update unit which updates ID information that corresponds to data stored on said removable medium when said detection unit detects that said removable medium is mounted;
    an ID information transmission unit which sends the ID information that is updated by said update unit via said network; and
    a data transmission unit which sends data via said network when receiving a transmission request to send the data that is stored on said removable medium and that corresponds to the ID information that is updated by said update unit.

2. The removable-medium apparatus of claim 1, wherein said update unit includes a storage unit that stores ID information that was assigned in the past and that corresponds to data stored on said removable medium, and an assignment unit that assigns ID information that is different from ID information that was assigned in the past.

3. The removable-medium apparatus of claim 1, further comprising a medium mounting unit which mounts a plurality of types of removable media; wherein said update unit updates ID information for each type of said removable media.

4. The removable-medium apparatus of claim 1, further comprising a counting unit which counts the number of times that said removable medium has been mounted; wherein said update unit updates ID information that corresponds to data that is stored on said removable medium based on the count value by said counting unit.

5. The removable-medium apparatus of claim 1, further comprising a timing unit; wherein said update unit updates ID information that corresponds to data that is stored on said removable medium based on the time that is counted by said timing unit.

6. The removable-medium apparatus of claim 1, further comprising a second detection unit which detects whether or not said removable medium is already mounted when a power is turned on; wherein said update unit updates ID information that corresponds to data that is stored on said removable medium that is mounted when said detection unit detects that said removable medium is mounted, and when said second detection unit detects that said removable medium is already mounted when the power is turned on.

7. A removable-medium apparatus which outputs data that is stored on a removable medium via a network, comprising:
    a detection unit which detects that a communication is performed via a network;
    an update unit which updates ID information that corresponds to data stored on said removable medium when said detection unit detects that the communication is performed via said network;
    an ID information transmission unit which sends the ID information that is updated by said update unit via said network; and
    a data transmission unit which sends data via said network when receiving a transmission request to send the data that is stored on said removable medium and that corresponds to the ID information that is updated by said update unit.

8. The removable-medium apparatus of claim 7, wherein said update unit includes a storage unit that stores ID information that was assigned in the past and that corresponds to data stored on said removable medium, and an assignment unit that assigns ID information that is different from ID information that was assigned in the past.

9. The removable-medium apparatus of claim 7, further comprising a medium mounting unit which mounts a plurality of types of removable media; wherein said update unit updates ID information for each type of said removable media.

10. The removable-medium apparatus of claim 7, further comprising a counting unit which counts the number of times that said removable medium has been mounted; wherein said update unit updates ID information that corresponds to data that is stored on said removable medium based on the count value by said counting unit.

11. The removable-medium apparatus of claim 7, further comprising a timing unit; wherein said update unit updates ID information that corresponds to data that is stored on said removable medium based on the time that is counted by said timing unit.

12. A method for controlling a removable-medium apparatus which outputs data that is stored on a removable medium via a network, comprising steps of:
    detecting that said removable medium is mounted;
    updating ID information that corresponds to data stored on said removable medium when it is detected that said removable medium is mounted;
    sending the updated ID information via said network; and
    sending data via said network when receiving a transmission request to send the data that is stored on said removable medium and that corresponds to the updated ID information.

13. A method for controlling a removable-medium apparatus which outputs data that is stored on a removable medium via a network, comprising steps of:
    detecting that a communication is performed via a network; updating ID information that corresponds to data stored on said removable medium when it is detected that the communication is performed via said network;

sending the updated ID information via said network; and
sending data via said network when receiving a transmission request to send the data that is stored on said removable medium and that corresponds to the updated ID information.

14. A computer-readable medium having computer readable instructions stored thereon, when executed by a computer for performing a method of controlling a removable-medium apparatus which outputs data that is stored on a removable medium via a network, the method comprising the steps of:
    causing the computer to detect that said removable medium is mounted;
    causing the computer to update ID information that corresponds to data stored on said removable medium when it is detected that said removable medium is mounted;
    causing the computer to send the updated ID information via said network; and
    causing the computer to send data via said network when receiving a transmission request to send the data that is stored on said removable medium and that corresponds to the updated ID information.

15. A computer-readable medium having computer readable instructions stored thereon, when executed by a computer for performing a method of controlling a removable-medium apparatus which outputs data that is stored on a removable medium via a network, the method comprising the steps of:
    causing the computer to detect that a communication is performed via a network;
    causing the computer to update ID information that corresponds to data stored on said removable medium when it is detected that the communication is performed via said network;
    causing the computer to send the updated ID information via said network; and
    causing the computer to send data via said network when receiving a transmission request to send the data that is stored on said removable medium and that corresponds to the updated ID information.

16. A removable-medium apparatus which outputs data that is stored on a removable medium via a network, comprising:
    a communication device which performs a communication via said network; and
    a processor capable of performing the operations of:
        detecting that said removable medium is mounted;
        updating ID information that corresponds to data stored on said removable medium when it is detected that said removable medium is mounted; and
        sending the updated ID information via said network; and
        sending data via said network when receiving a transmission request to send the data that is stored on said removable medium and that corresponds to the updated ID information.

17. A removable-medium apparatus which outputs data that is stored on a removable medium via a network, comprising:
    a communication device which performs a communication via said network; and
    a processor capable of performing the operations of:
        detecting that a communication is performed via a network;
        updating ID information that corresponds to data stored on said removable medium when it is detected that the communication is performed via said network;
        sending the updated ID information via said network; and
        sending data via said network when receiving a transmission request to send the data that is stored on said removable medium and that corresponds to the updated ID information.

18. A removable-medium apparatus which outputs data that is stored on a removable medium via a network, comprising:
    detection means for detecting that said removable medium is mounted;
    update means for updating ID information that corresponds to data stored on said removable medium when said detection means detects that said removable medium is mounted;
    ID information transmission means for sending the ID information that is updated by said update means via said network; and
    data transmission means for sending data via said network when receiving a transmission request to send the data that is stored on said removable medium and that corresponds to the ID information that is updated by said update means.

19. A removable-medium apparatus which outputs data that is stored on a removable medium via a network, comprising:
    detection means for detecting that a communication is performed via a network;
    update means for updating ID information that corresponds to data stored on said removable medium when said detection means detects that the communication is performed via said network;
    ID information-transmission means for sending the ID information that is updated by said update means via said network; and
    data transmission means for sending data via said network when receiving a transmission request to send the data that is stored on said removable medium and that corresponds to the ID information that is updated by said update means.

20. A removable-medium apparatus which outputs data that is stored on a removable medium, comprising:
    a detection unit which detects that said removable medium is mounted;
    an update unit which updates ID information that corresponds to data stored on said removable medium when said detection unit detects that said removable medium is mounted;
    an ID information output unit which outputs the ID information that is updated by said update unit; and
    a data output unit which outputs data when receiving a request to send the data that is stored on said removable medium and that corresponds to the ID information that is updated by said update unit.

21. A removable-medium apparatus which outputs data that is stored on a removable medium, comprising:
    a detection unit which detects that a communication to an external apparatus is performed;
    an update unit which updates ID information that corresponds to data stored on said removable medium when said detection unit detects that the communication is performed;
    an ID information output unit which outputs the ID information that is updated by said update unit; and
    a data output unit which outputs data when receiving a request to send the data that is stored on said removable medium and that corresponds to the ID information that is updated by said update unit.

22. A method for controlling a removable-medium apparatus which outputs data that is stored on a removable medium, comprising steps of:
  detecting that said removable medium is mounted;
  updating ID information that corresponds to data stored on said removable medium when it is detected that said removable medium is mounted;
  outputting the updated ID information; and
  outputting data when receiving a request to send the data that is stored on said removable medium and that corresponds to the updated ID information.

23. A method for controlling a removable-medium apparatus which outputs data that is stored on a removable medium, comprising steps of:
  detecting that a communication to an external apparatus is performed;
  updating ID information that corresponds to data stored on said removable medium when it is detected that the communication is performed;
  outputting the updated ID information; and
  outputting data when receiving a request to send the data that is stored on said removable medium and that corresponds to the updated ID information.

* * * * *